(12) United States Patent
Wang

(10) Patent No.: US 7,980,706 B2
(45) Date of Patent: Jul. 19, 2011

(54) PROJECTOR

(75) Inventor: Jiun-Shiun Wang, Hsinchu (TW)

(73) Assignee: Coretronic Corporation, Hsinchu (TW)

( * ) Notice: Subject to any disclaimer, the term of this patent is extended or adjusted under 35 U.S.C. 154(b) by 618 days.

(21) Appl. No.: 12/056,352

(22) Filed: Mar. 27, 2008

(65) Prior Publication Data
US 2009/0268168 A1 Oct. 29, 2009

(30) Foreign Application Priority Data
Oct. 9, 2007 (TW) .............................. 96137793 A

(51) Int. Cl.
G03B 21/26 (2006.01)
G02F 1/1335 (2006.01)
(52) U.S. Cl. .............................. 353/94; 349/5
(58) Field of Classification Search .................... 353/94, 353/98, 99, 122, 31, 30; 359/599
See application file for complete search history.

(56) References Cited

U.S. PATENT DOCUMENTS

| 5,884,991 | A * | 3/1999 | Levis et al. ................... 353/122 |
| 7,502,160 | B2 * | 3/2009 | Aksyuk et al. ................ 359/290 |
| 2003/0214633 | A1 * | 11/2003 | Roddy et al. .................... 353/31 |
| 2005/0134813 | A1 * | 6/2005 | Yoshikawa et al. ........... 353/122 |
| 2007/0023527 | A1 * | 2/2007 | Harley et al. ............ 235/462.45 |
| 2008/0198334 | A1 * | 8/2008 | Kasazumi et al. .............. 353/38 |

* cited by examiner

Primary Examiner — William C Dowling
Assistant Examiner — Ryan Howard
(74) Attorney, Agent, or Firm — Thomas|Kayden

(57) ABSTRACT

A projector comprising a first light source, a second light source, a light combining element, a diffuser and an actuator is provided. The first light source provides a first light beam with high coherence. The second light source provides a second light beam with high coherence. The light combining element comprises a first surface, wherein the first and second light beams enter the light combining element, and are combined into a mixed light beam therein. The diffuser is disposed on the first surface of the light combining element, wherein the first and second light beams enter the diffuser. The actuator is connected to the light combining element, wherein the actuator actuates the light combining element to vary locations where the first and second light beams enter the diffuser.

19 Claims, 6 Drawing Sheets

143

PROJECTOR

BACKGROUND OF THE INVENTION

1. Field of the Invention

The present invention relates to a projector, and more particularly to a projector capable of reducing speckle interference.

2. Description of the Related Art

Conventionally, when laser sources are utilized as light sources of projectors, high-coherence in laser beams tends to bring speckle interference, which blurs projection image or decreases image quality. Consequently, an additional diffuser is thus required to reduce coherence of laser beams.

U.S. Pat. Nos. 5,313,479, 6,594,090, 6,874,893 and 6,005,722 teach that additional diffusers are disposed on light paths to reduce coherence in laser beams. These diffusers, however, increase the number of optical elements, enlarge volume of the optical-mechanical systems, and raise design difficulties and costs thereof.

BRIEF SUMMARY OF THE INVENTION

A detailed description is given in the following embodiments with reference to the accompanying drawings.

According to a preferred embodiment of the present invention, a projector including a first light source, a second light source, a light combining element, a diffuser and an actuator is provided. The first light source provides a first light beam with high coherence. The second light source provides a second light beam with high coherence. The light combining element includes a first surface, wherein the first and second light beams enter the light combining element, and are combined into a mixed light beam therein. The diffuser is disposed on the first surface of the light combining element, wherein the first and second light beams enter the diffuser. The actuator is connected to the light combining element, wherein the actuator actuates the light combining element to vary locations where the first and second light beams enter the diffuser.

In a modified embodiment of the present invention, another projector including a first light source, a second light source, a light combining element, a diffuser, a first actuator and a second actuator is provided. The first light source provides a first light beam with high coherence. The second light source provides a second light beam with high coherence. The first and second light beams enter the light combining element, and are combined into a mixed light beam therein. The diffuser is disposed on a first surface of the light combining element, wherein the first and second light beams enter the diffuser. The first actuator is connected to the first light source, wherein the first actuator actuates the first light source to vary location where the first light beam enters the diffuser. The second actuator is connected to the second light source, wherein the second actuator actuates the second light source to vary location where the second light beam enters the diffuser.

In an embodiment of the present invention, the diffuser is adhered to or coated on the surface of the light-combining element. The number of optical elements and volume of the optical-mechanical system are decreased, and design difficulties of the optical-mechanical system are reduced.

Other objectives, features and advantages of the present invention will be further understood from the further technology features disclosed by the embodiments of the present invention wherein there are shown and described preferred embodiments of this invention, simply by way of illustration of modes best suited to carry out the invention.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

In the following detailed descriptions of the embodiments of the present invention, reference is made to the accompanying drawings which form a part hereof, and shows by way of illustration the method in which the present invention may be practiced. In this regard, directional terminology, such as "top," "bottom," "front," "back," etc., is used with reference to the orientation of the Figure(s) being described. Meanwhile, the components of the present invention can be positioned in a number of different orientations. As such, the directional terminology is used for purposes of illustration and is by no means limiting. Additionally, the drawings are only schematic and the sizes of components may be exaggerated for clarity. It is also to be understood that other embodiments may be utilized and structural changes may be made without departing from the general scope of the present invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless otherwise limited, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect surface-to-surface/directional orientations, and "adjacent to" and variations thereof herein are used broadly and encompass directly and indirectly "adjacent to" orientations. Therefore, the description of "A" component is facing "B" component herein may encompass situations where "A" component faces "B" component directly or one or more additional components are between "A" component and "B" component. Also, the description of "A" component is adjacent to "B" component herein may encompass situations where "A" component is directly adjacent to "B" component or one or more additional components are between "A" component and "B" component. Accordingly, the drawings and descriptions will be regarded as illustrative in nature and not as restrictive.

Figure 1:
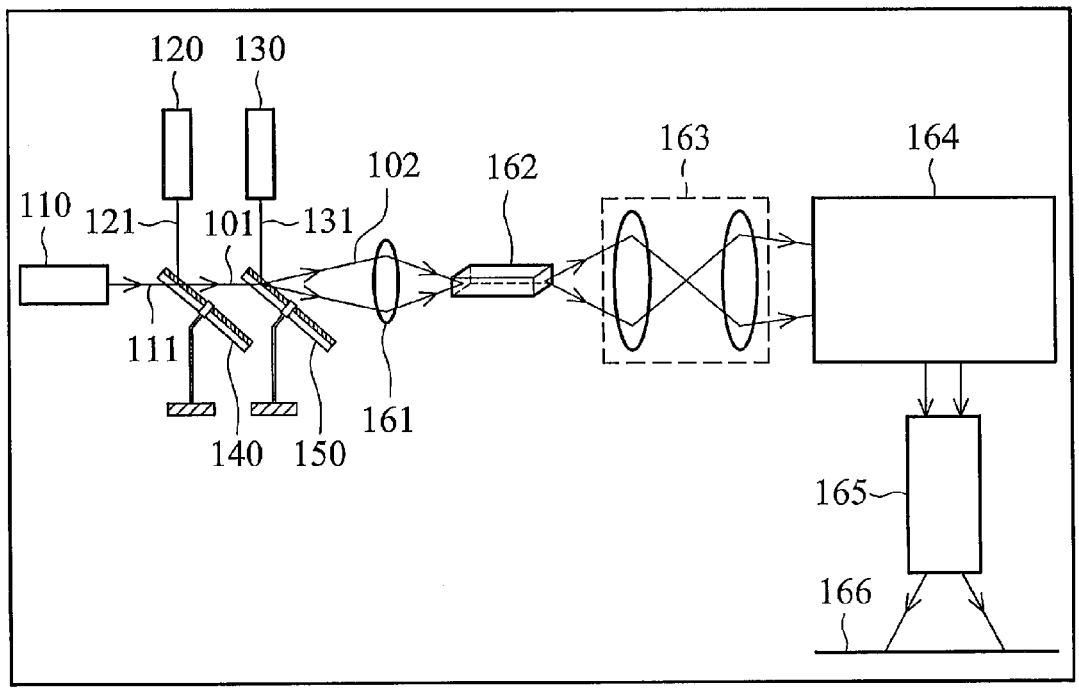
FIG. 1 schematically shows a projector of a first embodiment of the present invention.

FIG. 1 shows a projector 100 of a first embodiment of the present invention, which includes a first light source 110, a second light source 120, a third light source 130, a light-combining element 140, a light-combining element 150, a lens unit 161, an integrator rod 162, an illumination lens unit 163, a light valve 164 and a projection lens unit 165. The first light source 110 provides a first light beam 111. The second light source 120 provides a second light beam 121. The third light source 130 provides a third light beam 131. The first light beam 111, the second light beam 121 and the third light beam 131 have high coherence. The first light beam 111 and the second light beam 121 enter the light-combining element 140 to be combined into a mixed light beam 101 therein. The mixed light beam 101 and the third light beam 131 enter the light-combining element 150 to be combined into a mixed light beam 102 therein. The mixed light beam 102 travels from the light-combining element 150, passes the lens unit 161, the integrator rod 162, the illumination lens unit 163, the light valve 164 and the projection lens unit 165, and is projected onto a projection plane 166.

The light valve 164 may be a digital micromirror device (DMD), or a liquid crystal on silicon panel (LCOS) or other optical modulate elements. The first light source 110 is a green light source. The second light source 120 is a red light source. The third light source 130 is a blue light source.

Figure 2:
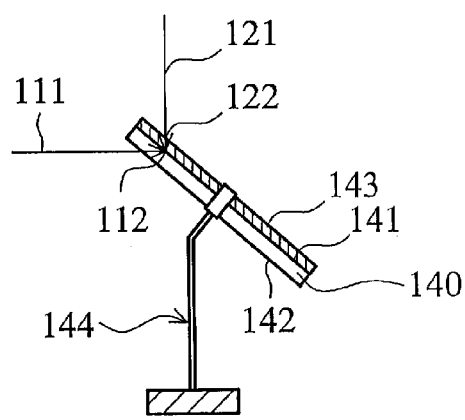
FIG. 2 schematically shows detailed structure of a light-combining element of the first embodiment of the present invention.

With reference to FIG. 2, the light-combining element 140 is a dichroic mirror, including a first surface (light-emitting surface) 141 and a second surface 142. A diffuser 143 is disposed on the first surface 141. The first light beam 111 enters the light-combining element 140 through the second surface 142. The second light beam 121 is reflected by the first surface 141 of the light-combining element 140. The first light beam 111 forms a first light spot 112 on the surface of the diffuser 143. The second light beam 121 forms a second light spot 122 on the surface of the diffuser 143. An actuator 144 is connected to the light-combining element 140. The actuator 144 actuates the light-combining element 140 to continuously vary locations of the first and second light spots 112, 122 on the diffuser 143 for decreasing coherence of the light beams.

A diffuser is disposed on the light-combining element 150, and an actuator is also connected thereto. The operation and function of the light-combining element 150 is similar to the light-combining element 140. The description of the light-combining element 150 is omitted for simplicity.

Figure 3A:
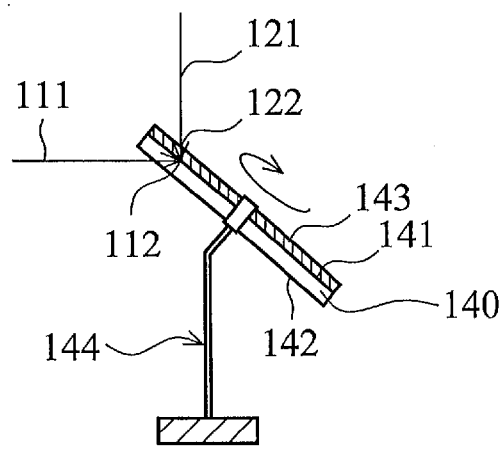
FIG. 3a schematically shows an actuator rotating the light-combining element.
Figure 3B:
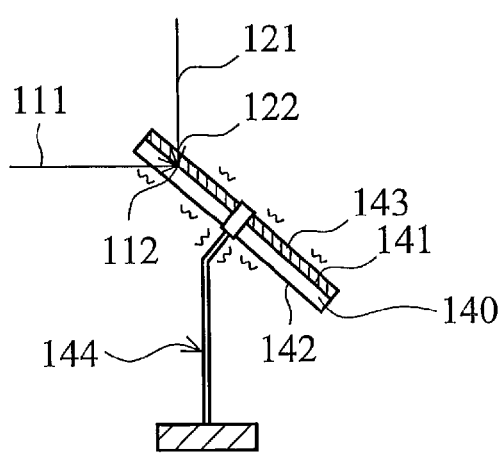
FIG. 3b schematically shows an actuator vibrating the light-combining element.

With reference to FIG. 3a, in the first embodiment, the actuator 144 is a motor, which rotates the light-combining element 140 to continuously vary locations of the first light spot 112 and second light spot 122 on the diffuser 143. FIG. 3b shows a modified example of the present invention, wherein the actuator 144 is a vibrator, which vibrates the light-combining element 140 to continuously vary locations of the first light spot 112 and second light spot 122 on the diffuser 143.

Figure 4:
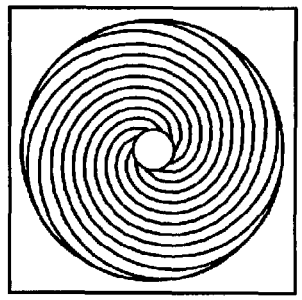
FIG. 4 schematically shows detailed structure of a diffuser.

With reference to FIG. 4, the diffuser 143 is a spiral diffuser.

In the embodiment of the present invention, the diffuser is adhered to or coated on the surface of the light-combining element. The number of optical elements and volume of the optical-mechanical system are decreased, and design difficulties of the optical-mechanical system are reduced.

Figure 5:
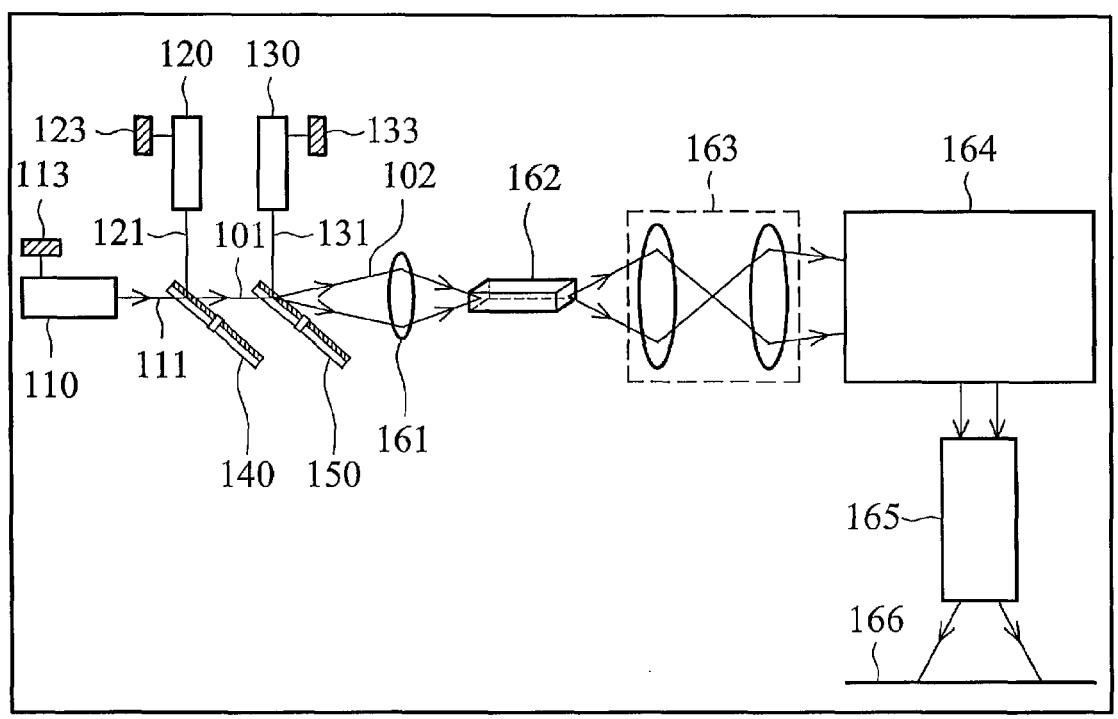
FIG. 5 schematically shows a projector of a second embodiment of the present invention.

FIG. 5 shows a projector 100' of a second embodiment of the present invention, wherein the actuators thereof is connected to the light sources. A first actuator 113 is connected to the first light source 110. A second actuator 123 is connected to the second light source 120. A third actuator 133 is connected to the third light source 130. The first light source 110, the second light source 120 and the third light source 130 are vibrated by the first actuator 113, the second actuator 123 and the third actuator 133 to continuously vary locations where the light beams enter the light-combining elements to reduce coherence.

Figure 6A:
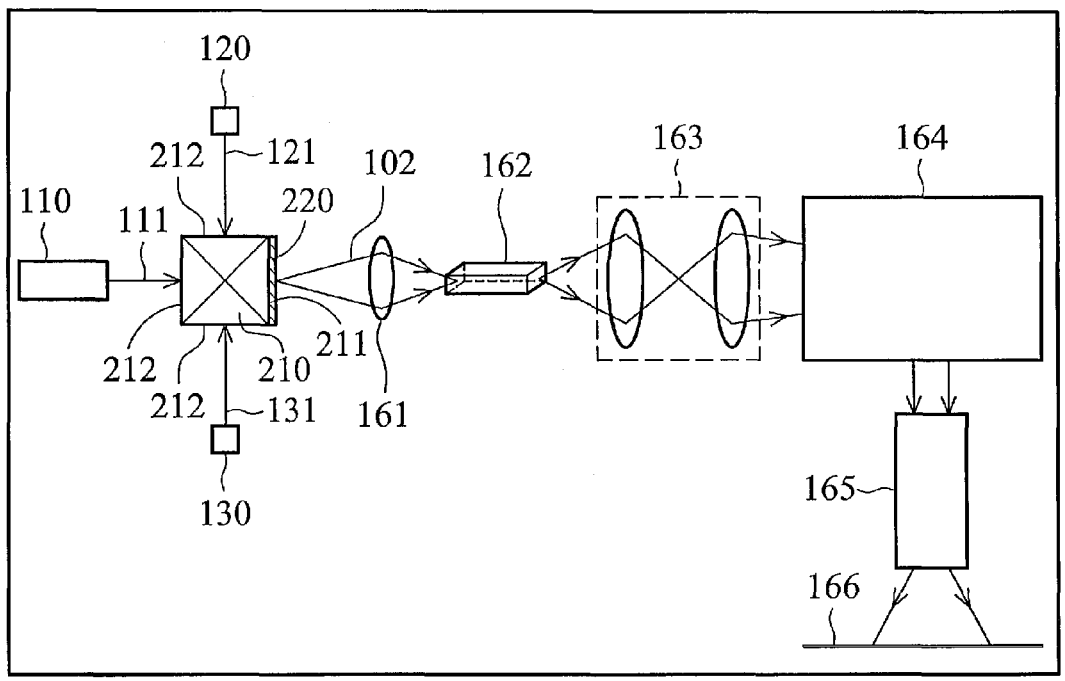
FIG. 6a schematically shows a projector of a third embodiment of the present invention.
Figure 6B:
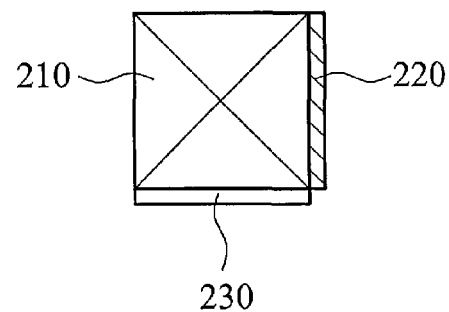
FIG. 6b schematically shows detailed structure of a light-combining element of the third embodiment of the present invention.

FIG. 6a shows a projector 200 of a third embodiment of the present invention, which utilizes an X-prism as the light-combining element. The light-combining element 210 comprises a plurality of light-entering surfaces 212 and a light-emitting surface (first surface) 211. The first light beam 111, the second light beams 121 and the third light beam 131 enter the light-combining element 210 through the light-entering surfaces 212 to form the mixed light beam 102. The mixed light beam 102 leaves the light-combining element 210 through the light-emitting surface 211. A diffuser 220 is disposed on the light-emitting surface 211. With reference to FIG. 6b, an actuator 230 is disposed on the bottom of the light-combining element 210. The actuator 230 vibrates the light-combining element 210 to continuously vary locations where the mixed light beam 102 enters the diffuser 220.

Figure 7:
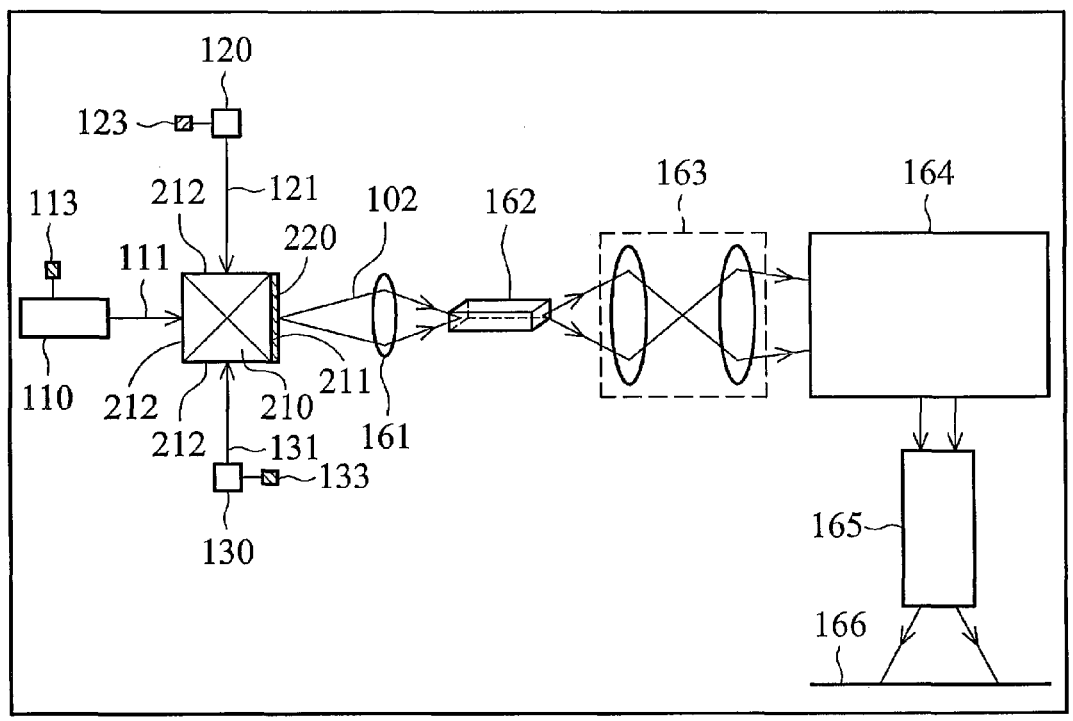
FIG. 7 schematically shows a projector of a fourth embodiment of the present invention.

FIG. 7 shows a projector 200' of a fourth embodiment of the present invention, similar to the third embodiment, the fourth embodiment utilizes the X-prism as the light-combining element. Similar to the second embodiment, the actuators is connected to the light sources in the fourth embodiment. The first actuator 113 is connected to the first light source 110. The second actuator 123 is connected to the second light source 120. The third actuator 133 is connected to the third light source 130. The first light source 110, the second light source 120 and the third light source 130 are vibrated by the first actuator 113, the second actuator 123 and the third actuator 133 to continuously vary locations where the light beams enter the light-combining element to reduce coherence.

Figure 8A:
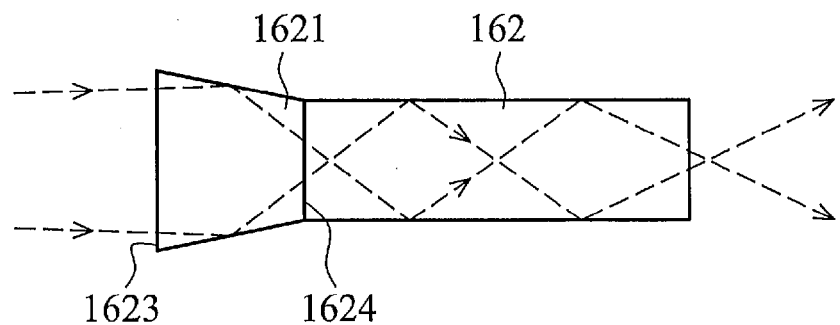
FIG. 8a schematically shows a light-collecting element disposed on a front end of a integrator rod.
Figure 8C:
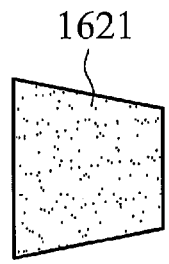
FIGS. 8b and 8c schematically show a hollow light-collecting element.
Figure 8B:
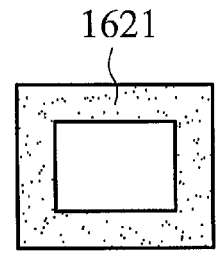
Figure 8D:
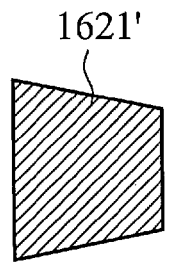
FIGS. 8d and 8e schematically show a solid light-collecting element.
Figure 8E:
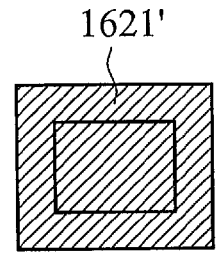

In the embodiments of the present invention, divergent angles of the light beams increase after the light beams pass the diffusers. Additionally, cross-sections of the light beams increase as a result of the vibration of the light beams generated by the vibrator. Therefore, light-collection of the lens unit may be redesigned to collect the light beams with lens unit into the integrator rod to improve light utilization. In a modified example, a light-collecting element 1621 (for example, cap rod or tapered rod) is disposed on a front end of the integrator rod 162. The light-collecting element 1621 comprises a light-entering side 1623 and a light-emitting side 1624, the area of the light-emitting side 1624 is smaller than that of the light-entering side 1623, the mixed light beam enters the light-collecting element 1621 through the light-entering side 1623, and leaves the light-collecting element 1621 through the light-emitting side 1624 to the integrator rod 162. The light-collecting element improves light utilization by increasing the area of the light-entering side to collect light beams with large divergent angles. With reference to FIGS. 8b and 8c, the light-collecting element 1621 is a hollow element, and a reflective layer is coated on the surface thereof. With reference to FIGS. 8d and 8e, in another example, the light-collecting element 1621' is a solid element, which guides light beams by total reflection or the reflective layer coated on the surface thereof. Cross-section of the light-collecting element 1621 may be square, circular, polygon or other shapes.

The foregoing descriptions of the preferred embodiments of the present invention have been presented for purposes of illustration and description. It is not intended to be exhaustive or to limit the present invention to a precise form or to the exemplary embodiments disclosed. Accordingly, the foregoing description should be regarded as illustrative rather than restrictive. Obviously, a variety of modifications and variations will be apparent to those with ordinary skill in the art. Moreover, the embodiments are chosen and described in order to best explain the principles of the present invention and its best mode practical applications, to enable those with ordinary skill in the art to understand the present invention for implementation of various embodiments and modifications of the present invention, which conform to particular usages or contemplated implementations. It is intended that the scope of the present invention be defined by the claims appended hereto and their equivalents, whereby all terms are meant in their broadest reasonable sense unless otherwise indicated. Therefore, the term "the invention", "the present invention" or the like does not necessarily limit the claim scope to a specific embodiment, and references to "preferred exemplary embodiments of the present invention", do not imply a limitation on the present invention and no such limitation is to be inferred. The present invention is limited only by the general spirit and scope of the appended claims. The abstract of the present disclosure is provided to comply with the rules required for an abstract, which will allow a searcher to quickly ascertain the subject matter of the technical disclosure of any patent issued related to the present disclosure. It is submitted with the understanding that it will not be used to interpret or limit the scope or meaning of the claims. Meanwhile, any advantages and benefits described in the present disclosure for the present invention may not apply to all embodiments of the present invention. It should be appreciated that variations may be made to the embodiments described herein by those skilled in the art, without departing from the general scope of the present invention as defined by the following claims. Moreover, no element and component in the present disclosure is intended to be dedicated to the public, regardless of whether the element or component is explicitly recited in the following claims.

What is claimed is:

1. A projector, comprising:
   a first light source, providing a first light beam with high coherence;
   a second light source, providing a second light beam with high coherence;
   a light combining element, wherein the first and second light beams are incident on the light combining element, and are combined into a mixed light beam therein;
   a diffuser, disposed on a first surface of the light combining element, wherein the first and second light beams are incident on the diffuser, and the diffuser is a spiral diffuser; and
   an actuator, connected to the light combining element, wherein the actuator actuates the light combining element to vary locations where the first and second light beams enter the diffuser.

2. The projector as claimed in claim 1, wherein the first light source and the second light source respectively are laser sources.

3. The projector as claimed in claim 1, wherein the light combining element is a dichroic mirror.

4. The projector as claimed in claim 3, wherein the light combining element further comprises a second surface; the first light beam enters the light combining element through the second surface, leaves the light combining element through the diffuser on the first surface, and forms a first light spot on the diffuser; the second light beam is reflected by the first surface and forms a second light spot on the diffuser after passing the diffuser.

5. The projector as claimed in claim 4, wherein the actuator comprises a motor, the actuator rotates the light combining element to continuously vary locations of the first and second light spots on the diffuser.

6. The projector as claimed in claim 4, wherein the actuator comprises a vibrator, the actuator vibrates the light combining element to continuously vary locations of the first and second light spots on the diffuser.

7. The projector as claimed in claim 1, wherein the light combining element is an X-prism.

8. The projector as claimed in claim 7, wherein the light combining element comprises a plurality of light-entering surfaces and a light-emitting surface, the first surface is the light-emitting surface, and the first light beam and the second light beam enter the light combining element through the light-entering surfaces, and leave the light combining element through the light-emitting surface.

9. The projector as claimed in claim 8, wherein the actuator comprises a vibrator, the actuator vibrates the light combining element to continuously vary location where the mixed light beam enters the diffuser.

10. The projector as claimed in claim 1, further comprising a light-collecting lens unit and an integrator rod, wherein the mixed light beam passes the light-collecting lens unit, and enters the integrator rod.

11. The projector as claimed in claim 10, further comprising a light-collecting element, wherein the light-collecting element comprises a light-entering side and a light-emitting side; the area of the light-emitting side is smaller than that of the light-entering side; the mixed light beam enters the light-collecting element through the light-entering side, leaves the light-collecting element through the light-emitting side, and then enters the integrator rod.

12. A projector, comprising:
    a first light source, providing a first light beam with high coherence;
    a second light source, providing a second light beam with high coherence;
    a light combining element, wherein the first and second light beams enter the light combining element, and are combined into a mixed light beam therein;
    a diffuser, disposed on a first surface of the light combining element, wherein the first and second light beams enter the diffuser, and the diffuser is a spiral diffuser; and
    a first actuator, connected to the first light source, wherein the first actuator actuates the first light source to vary location where the first light beam enters the diffuser; and
    a second actuator, connected to the second light source, wherein the second actuator actuates the second light source to vary location where the second light beam enters the diffuser.

13. The projector as claimed in claim 12, wherein both the first and second actuators are vibrators.

14. The projector as claimed in claim 13, wherein the light combining element is a dichroic mirror.

15. The projector as claimed in claim 14, wherein the light combining element further comprises a second surface; the first light beam enters the light combining element through the second surface, leaves the light combining element through the diffuser on the first surface, and forms a first light spot on the diffuser; the second light beam is reflected by the first surface, and forms a second light spot on the diffuser after passing the diffuser; the first and second actuators respectively vibrate the first and second light sources to continuously vary locations of the first and second light spots on the diffuser.

16. The projector as claimed in claim 12, wherein the light combining element is an X-prism.

17. The projector as claimed in claim 16, wherein the light combining element comprises a plurality of light-entering surfaces and a light-emitting surface; the first surface is the light-emitting surface; the first light beam and the second light beam enter the light combining element through the light-entering surfaces, and leave the light combining element through the light-emitting surface.

18. The projector as claimed in claim 12, further comprising a light-collecting lens unit and an integrator rod, wherein the mixed light beam enters the light-collecting lens unit, and enters the integrator rod.

19. The projector as claimed in claim 18, further comprising a light-collecting element, wherein the light-collecting element comprises a light-entering side and a light-emitting side; an area of the light-emitting side is smaller than that of the light-entering side; the mixed light beam enters the light-collecting element through the light-entering side, and leaves the light-collecting element through the light-emitting side, and then enters the integrator rod.

\* \* \* \* \*